United States Patent
Schwarz et al.

(10) Patent No.: US 6,464,290 B2
(45) Date of Patent: Oct. 15, 2002

(54) FRAME STRUCTURE OF A BODY FOR A MOTOR VEHICLE

(75) Inventors: Hartmut Schwarz, Engelsbrand; Reza Shakory-Tabrizi, Markgroeningen, both of (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/942,041

(22) Filed: Aug. 30, 2001

(65) Prior Publication Data
US 2002/0030385 A1 Mar. 14, 2002

(30) Foreign Application Priority Data
Aug. 30, 2000 (DE) .......................... 100 42 410

(51) Int. Cl.⁷ .................................. B60J 7/50
(52) U.S. Cl. ................... 296/203.03; 296/205
(58) Field of Search ............. 296/205, 203.03, 296/203.01

(56) References Cited

U.S. PATENT DOCUMENTS 3,292,969 A * 12/1966 Eggert, Jr.
3,825,297 A 7/1974 Barenyi
4,451,077 A 5/1984 Harloff et al. ............. 296/205 X
5,848,853 A * 12/1998 Clenet ..................... 296/205 X
6,102,472 A * 8/2000 Wallstrom ............. 296/203.01

FOREIGN PATENT DOCUMENTS

DE 30 46 056 6/1980

* cited by examiner

Primary Examiner—Joseph D. Pape
(74) Attorney, Agent, or Firm—Crowell & Moring LLP

(57) ABSTRACT

A frame structure of a body for a motor vehicle and a method of making same. The frame structure includes at least one lateral support arrangement which extends in a longitudinal direction of the motor vehicle between a forward body region and a rearward body region. The at least one lateral support arrangement is arranged to arch over a vehicle occupant compartment above a belt line and is bounded by a roof of the motor vehicle. The at least one lateral support arrangement includes a tube support which is operatively connected with a first reinforcement in a forward body region of the motor vehicle and a second reinforcement in a rearward body region of the motor vehicle. The tube support forms a stiff frame composite for the at least one support arrangement by way of a holding device operatively arranged with the tube supports. The frame structure of the present invention is relatively simple to manufacture and provides optimal stiffness.

22 Claims, 2 Drawing Sheets

FRAME STRUCTURE OF A BODY FOR A MOTOR VEHICLE

BACKGROUND AND SUMMARY OF THE INVENTION

This application claims the priority of German Application No. 100 42 410.4, filed in Germany on Aug. 30, 2000, the disclosure of which is expressly incorporated by reference herein.

The invention relates to a frame structure of a body for a motor vehicle, particularly for a passenger car and a method of making same.

The frame structure is of the type having lateral support arrangements which extend, viewed in the longitudinal direction of the motor vehicle, between a forward body region and a rearward body region and arch over a vehicle occupant compartment above a belt line and bound a roof, each support arrangement comprising a tube support.

A known passenger car of the initially mentioned type is disclosed in U.S. Pat. No. 3,825,297 which has a vehicle body structure with lateral tube supports arching over a roof above a belt line in a longitudinal direction of the vehicle. The roof, which consists of light metal or plastic, is provided with deformations for the tube supports. The deformations surround the tube supports at a defined distance without being connected with the latter. Furthermore, each tube support extends between a forward and a rearward vehicle body region. This construction has the disadvantage that the deformations of the roof and the tube supports are inserted into the vehicle body structure independently of one another, whereby their stiffness is reduced which can impair particularly a roof structure with a relative large roof cutout for stationary and/or displaceable plane glass elements.

German Patent Document DE 30 46 056 C2 (corresponding to U.S. Pat. No. 4,451,077) relates to plane components for vehicle bodies which are reinforced by means of tubes. In the case of an embodiment of this reference, an edge area of a planking is provided with a holder for a tube. The holder surrounds the tube in sections by means of retaining clips and is connected with the above-mentioned tube by welding, gluing or riveting. Since the holder is reinforced by means of the tube and is connected with the planking only in the edge area, this construction, if at all, is suitable only to a limited extent for highly stressed applications.

It is an object of the invention to design lateral supporting devices of a frame structure of a vehicle body, which arch over the vehicle occupant space above a belt line in the longitudinal direction of the vehicle in such a manner that, while the manufacturing is simple, they have a high stiffness in conjunction with the frame structure.

According to the invention, this object is achieved by connecting each of the tube supports with a first reinforcement in the forward body region and a second reinforcement in the rearward body region, and the tube support forms a stiff frame composite with the support arrangement by way of a holding device.

The principal advantages achieved by the features of the invention are that the tube support with the first reinforcement and the second reinforcement can be integrated effectively into the forward and the rearward vehicle body region and forms a stiff frame composite with the support arrangement. The frame composite provides the frame structure as a whole with a pronounced stability. In this case, it is possible to construct the cross-section comprising the support arrangement and the tube supports in a compact manner and with a low space requirement, whereby adjacent vehicle body elements, preferably relatively large-surface, for example, fixed and movable glass elements of a corresponding glass roof construction, can be designed in a targeted manner. The tube support and the support arrangement are components which can be produced and assembled by way of known technical methods. The latter is finally promoted in that the tube support, the first reinforcement, the second reinforcement and the holding device are constructed as a prefabricated module which can be assembled with the support arrangement in a simple manner.

Other objects, advantages and novel features of the present invention will become apparent from the following detailed description of the invention when considered in conjunction with the accompanying drawings.

DETAILED DESCRIPTION OF THE DRAWINGS

Figure 1:
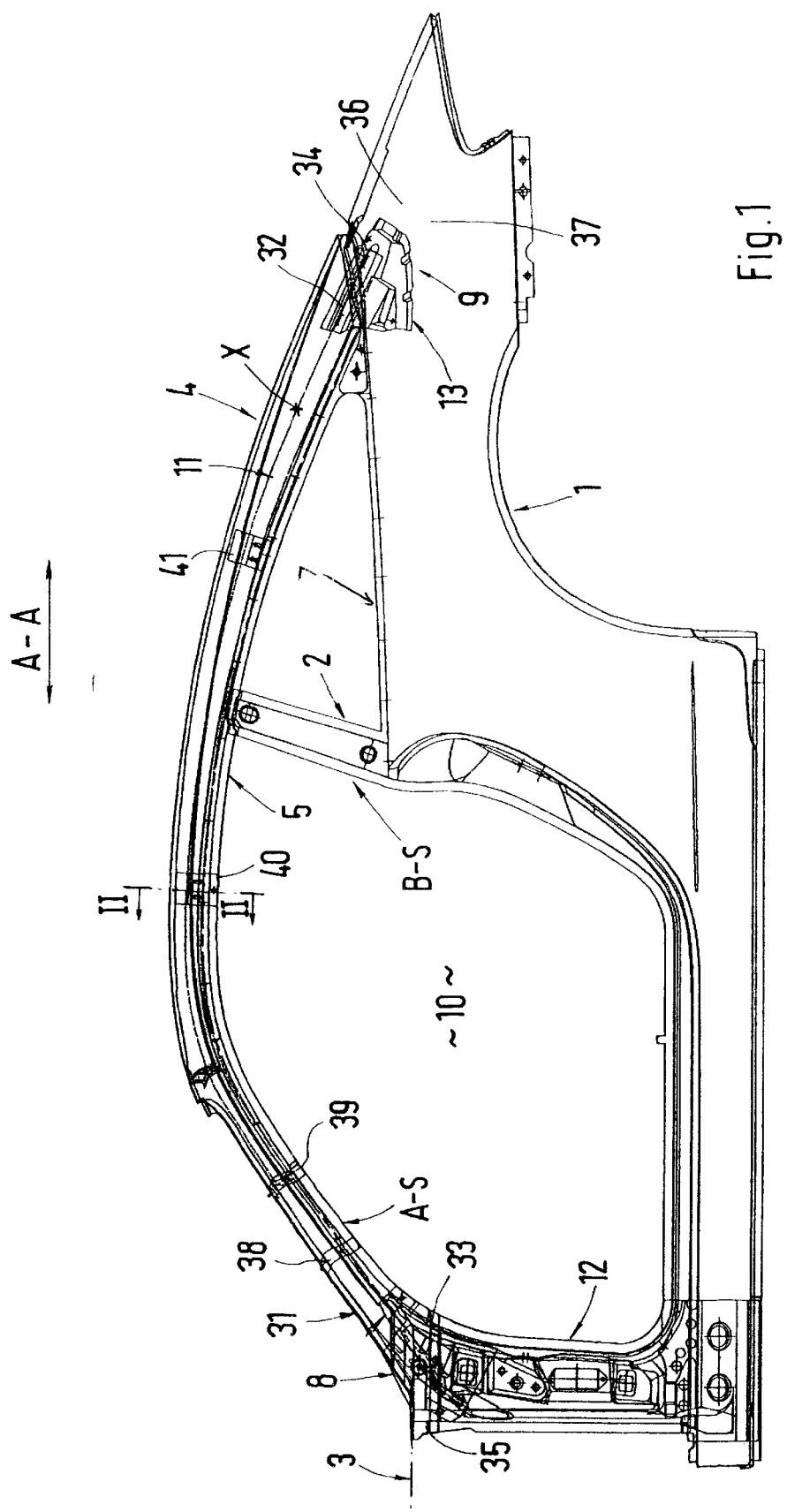
FIG. 1 is a lateral view of a body of a passenger car having a frame structure according to the invention.
Figure 2:
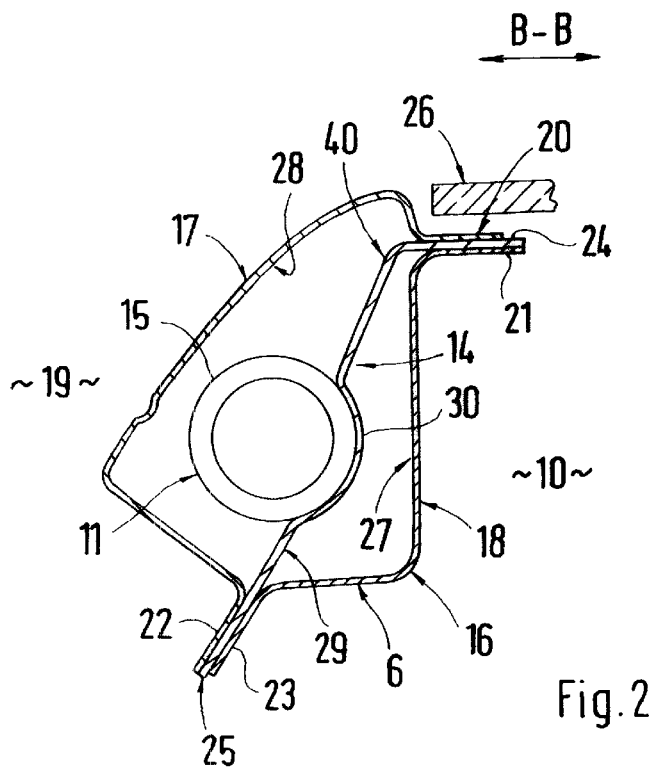
FIG. 2 is an enlarged sectional view according to Line II—II of FIG. 1.

FIG. 1 illustrates a body 2 of a passenger car 1 which has a notch-type front end 3, a fast back 4 and a frame structure 5. The frame structure 5 has lateral support arrangements 6 (See FIG. 2), a left one and a right one, each being arranged above a belt line 7 between a forward body region 8 adjacent to an A-column A-S and a rearward body region 9 situated behind a B-column B-S, and arching over a vehicle occupant compartment 10 of the passenger car 1 in the longitudinal direction A—A of the vehicle. A tube support 11 contributes to the special stability of the above-mentioned support arrangement 6 and is a component of the support arrangement 6.

The tube support 11 is firmly connected with a first reinforcement 12 in the forward body region 8 and with a second reinforcement 13 in the rearward body region 9 and, by way of a holding device 14, forms a rigid frame composite with the support arrangement 6. The holding device 14 carries the tube support 11 which comprises a tube 15 with a circular cross-section which is made of, for example, high-strength steel. The support arrangement 6 is formed by a hollow frame support 16 with a first hollow support shell 17 and a second hollow support shell 18. The first hollow support shell 17 faces an exterior side 19 and the second hollow support shell 18 faces the occupant compartment 10 of the passenger car 1. Furthermore, the hollow support shells 17 and 18, which comprise, for example, a metal, are provided with horizontal flanges 20, 21 and substantially upright flanges 22, 23. Additional flanges 24 and 25 of the holding device 14 are provided between the flanges 20, 21 and 22, 23 of the hollow support shells 17, 18. On the flanges 20, 21 and 24 as well as 22, 23 and 25, the hollow support shells 17, 18 and the holding device 14 are connected with one another, for example, by spot welding. Above the horizontal flanges 20, 21, a plane vehicle body element 26 is arranged which is made of glass and is relatively wide in the transverse direction B—B of the vehicle in order to optimize the unobstructed upward view for the occupants of the passenger car. As a result, the support arrangement 6 is relatively narrow in the transverse direction of the vehicle.

Within the support arrangement 6, the holding device 14 is arranged between the flanges 20, 21 and 22, 23 such that two additional hollow supports 27, 28 are created. The additional hollow supports 27, 28 provide the support arrangement 6, in conjunction with the tube support 11, with a stiffness which withstands defined stress situations. For the connection of the holding device 14 with the tube support 11 which is appropriate for the operation, a straight wall section 29 of this holding device is equipped with a receiving device 30 which surrounds the tube support 11.

The first reinforcement 12, which is connected with an end area 31 of the tube support 11 by way of suitable methods, for example, by welding, is a pressed piece made of metal with deformations which increase its strength. The reinforcement 13, which is connected to an end area 32 of the tube support, has a similar construction. Both reinforcements 12 and 13 are provided with receiving devices 33 and 34 for the end areas 31 and 32 of the tube support 11 and are constructionally combined with stationary body parts 35 and 36 of the frame structure 5, which body parts 35 and 36 extend on an interior side 37 of the vehicle body 2.

In a preferred embodiment, the holding device 14 is formed by several individual short holders 38, 39, 40 and 41 which are distributed along the length of the tube support 11 and are integrated in the support arrangement 6. However, a continuous holding device constructed as a pressed piece is also conceivable between the forward reinforcement 12 and the rearward reinforcement 13.

Figure 3:
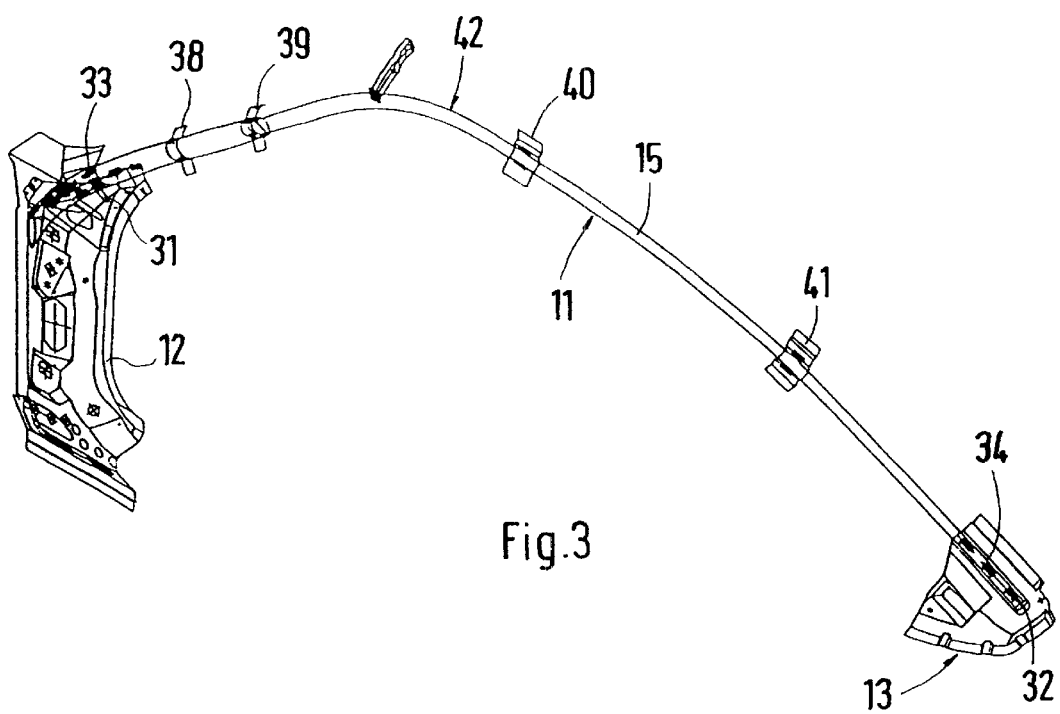
FIG. 3 is a diagonal view of a detail X of FIG. 1.

Finally, as shown in FIG. 3, the tube supports 11, the reinforcements 12, 13 and the holding device 14 can be combined to a prefabricated module 42 which is connected with the corresponding components during the manufacturing of the vehicle body 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Frame structure of a body for a motor vehicle having lateral support arrangements which extend in a longitudinal direction of the motor vehicle between a forward body region and a rearward body region and arch over a vehicle occupant compartment above a belt line and bound a roof, each support arrangement comprising a tube support,
   wherein the tube supports are connected with a first reinforcement in the forward body region and a second reinforcement in the rearward body region, and the tube support forms a stiff frame composite with the support arrangement by way of a holding device.

2. Frame structure according to claim 1, wherein the support arrangement is formed by a hollow frame support comprising a first hollow support shell and a second hollow support shell, the hollow frame support being reinforced by way of the tube support and the holding device.

3. Frame structure according to claim 2, wherein the holding device forms additional hollow supports by way of the hollow frame support.

4. Frame structure according to claim 2, wherein the additional hollow supports are formed by the arrangement of the holding device between the two hollow support shells.

5. Frame structure according to claim 4, wherein the holding device is mounted by way of flanges formed therein which are arranged between flanges of the hollow support shells.

6. Frame structure according to claim 2, wherein the holding device has a receiving device surrounding the tube support.

7. Frame structure according to claim 6, wherein the tube support comprises a tube having a circular cross-section to which the receiving device is adapted.

8. Frame structure according to claim 7, wherein the tube comprises a high-strength steel.

9. Frame structure according to claim 2, wherein the first hollow support shell is directed to an exterior side of the motor vehicle, and the second hollow support shell is directed to an occupant compartment.

10. Frame structure according to claim 1, wherein the holding device comprises several holders which are distributed along a length of the tube support.

11. Frame structure according to claim 1, wherein the first reinforcement and the second reinforcement have receiving devices for the tube support, the receiving devices being firmly connected with end areas of the tube support.

12. Frame structure according to claim 1, wherein the first reinforcement and the second reinforcement are fastened to an interior side of the vehicle body.

13. Frame structure according to claim 1, wherein the tube support, the first reinforcement, the second reinforcement and the holding device are constructed as a prefabricated module.

14. A frame structure of a body for a motor vehicle comprising:
   at least one lateral support arrangement extending in a longitudinal direction of the motor vehicle between a forward body region and a rearward body region, the at least one lateral support arrangement arranged to arch over a vehicle occupant compartment above a belt line and being bounded by a roof of the motor vehicle;
   wherein the at least one lateral support arrangement comprises a tube support operatively connected with a first reinforcement in a forward body region of the motor vehicle and a second reinforcement in a rearward body region of the motor vehicle; and
   wherein the tube support forms a stiff frame composite for the at least one support arrangement by way of a holding device operatively arranged with the tube support.

15. The frame structure according to claim 14, wherein the frame structure is arranged in a passenger car.

16. The frame structure according to claim 14, wherein the support arrangement comprises a first hollow support shell and a second hollow support shell which are arranged to form a hollow frame support, the hollow frame support being reinforced by the tube support and the holding device.

17. The frame structure according to claim 14, wherein the holding device is connected to the first and second hollow support shells by way of flanges on the holding device and flanges formed on the first and second hollow support shells.

18. The frame structure according to claim 14, wherein the holding device is formed with a receiving area which partially surrounds the tube support.

19. The frame structure according to claim 18, wherein the tube support comprises a tube having a circular cross-section onto which the receiving area of the holding device is adaptable.

20. The frame structure according to claim 14, wherein the holding device comprises a plurality of holders which are distributed along a length of the tube support.

21. A method of making a frame structure of a body for a motor vehicle comprising:
   providing a tube support of at least one lateral support arrangement in operative connection with a first reinforcement in a forward body region of the motor vehicle and a second reinforcement in a rearward body region of the motor vehicle;

operatively connecting a holding device to the tube support to form a stiff frame composite for the at least one support arrangement; and arranging the at least one lateral support arrangement to extend in a longitudinal direction of the motor vehicle between the forward body region and the rearward body region, the at least one lateral support arrangement arching over a vehicle occupant compartment above a belt line and being bounded by a roof of the motor vehicle.

22. A motor vehicle body assembly comprising:

a forward body region adjacent an A-column of the motor vehicle;

a rearward body region situated behind a B-column of the motor vehicle; and a frame structure arranged between the forward body region and the rearward body region, the frame structure comprising at least one lateral support arrangement extending in a longitudinal direction of the motor vehicle between the forward body region and the rearward body region and arranged to arch over a vehicle occupant compartment above a belt line and being bounded by a roof of the motor vehicle;

wherein the at least one lateral support arrangement comprises a tube support operatively connected with a first reinforcement arranged on the forward body region of the motor vehicle and a second reinforcement arranged on a rearward body region of the motor vehicle; and wherein the tube support forms a stiff frame composite for the at least one support arrangement by way of a holding device operatively arranged with the tube support.

* * * * *